United States Patent [19]

Taylor et al.

[11] 4,073,201
[45] Feb. 14, 1978

[54] POWERED WRIST JOINT

[75] Inventors: Henry James Taylor, Willowdale; Philip Nicholas Peter Ibbotson, Mississauga, both of Canada

[73] Assignee: Spar Aerospace Products Limited, Toronto, Canada

[21] Appl. No.: 732,733

[22] Filed: Oct. 15, 1976

[51] Int. Cl.² ................... F16H 37/06; F16M 11/04
[52] U.S. Cl. ................... 74/665 L; 74/665 P; 74/479; 248/179
[58] Field of Search ............ 74/474, 480, 665 R, 74/665 L, 665 M, 665 N, 665 P, 640; 248/179; 343/757, 880

[56] References Cited

U.S. PATENT DOCUMENTS

| 2,899,677 | 8/1959 | Rockall | 343/757 |
|---|---|---|---|
| 3,164,340 | 1/1965 | Slater et al. | 74/479 UX |
| 3,166,949 | 1/1965 | Lapp | 74/640 X |
| 3,229,941 | 1/1966 | Suliteanu et al. | 343/757 X |
| 3,541,561 | 11/1970 | Chubb, Jr. | 343/757 |
| 3,626,769 | 12/1971 | Hecker et al. | 74/479 X |
| 3,691,864 | 9/1972 | Cochran et al. | 74/479 |
| 3,765,631 | 10/1973 | Herbst et al. | 248/179 X |
| 4,006,645 | 2/1977 | Newell | 74/479 |

*Primary Examiner*—Benjamin W. Wyche
*Assistant Examiner*—Lance W. Chandler
*Attorney, Agent, or Firm*—Fetherstonhaugh & Co.

[57] ABSTRACT

A powered wrist joint consisting of a base having a pitch member mounted thereon for rotation about a pitch axis and a pitch drive mounted on the base for driving the pitch member about the pitch axis and a yaw shaft mounted on the pitch member on a yaw axis which is disposed at right angles to and intersects the pitch axis. A housing is mounted on the yaw shaft for rotation about the yaw axis. A yaw drive is mounted in the housing for driving the housing about the yaw axis and a roll shaft is mounted for rotation in the housing about the roll axis which is disposed at right angles to the pitch and yaw axes and intersects the pitch and yaw axes at their point of intersection thereby to provide a common center of pitch, yaw and roll gyration.

13 Claims, 11 Drawing Figures

POWERED WRIST JOINT

The C-shaped configuration of the pitch member is also particularly suitable for permitting movement of the roll shaft about the yaw axis through an arc in excess of 180°. This is achieved by locating the roll shaft so that it projects through the yaw passage between the ends of the C-shaped configuration of the pitch member.

SUMMARY

According to one aspect of the present invention, a powered wrist joint consists of a base member having a pitch member mounted thereon for rotation about a pitch axis and pitch drive means mounted on the base for driving the pitch member about the pitch axis and yaw shaft means mounted on the pitch member on a yaw axis which is disposed at right angles and intersects the pitch axis, a housing mounted on the yaw shaft means for rotation about the yaw axis, yaw drive means mounted in the housing for driving the housing about the yaw axis and a roll shaft mounted for rotation in the housing about a roll axis which is disposed at right angles to the pitch and a yaw axis and intersects the pitch and yaw axes at their point of intersection thereby to provide a common center of pitch, yaw and roll gyration.

The invention will be more clearly understood after reference to the following detailed specification read in conjunction with the drawings, wherein FIG. 1 is a pictorial view of a shuttle craft used for servicing orbiting satellites in which a wrist joint of the present invention may be employed as an integral part of the satellite's retrieval arm;

FIG. 7 is a sectional view of the band tensioning mechanism taken along the line 7—7 of FIG. 2;

Figure 1:
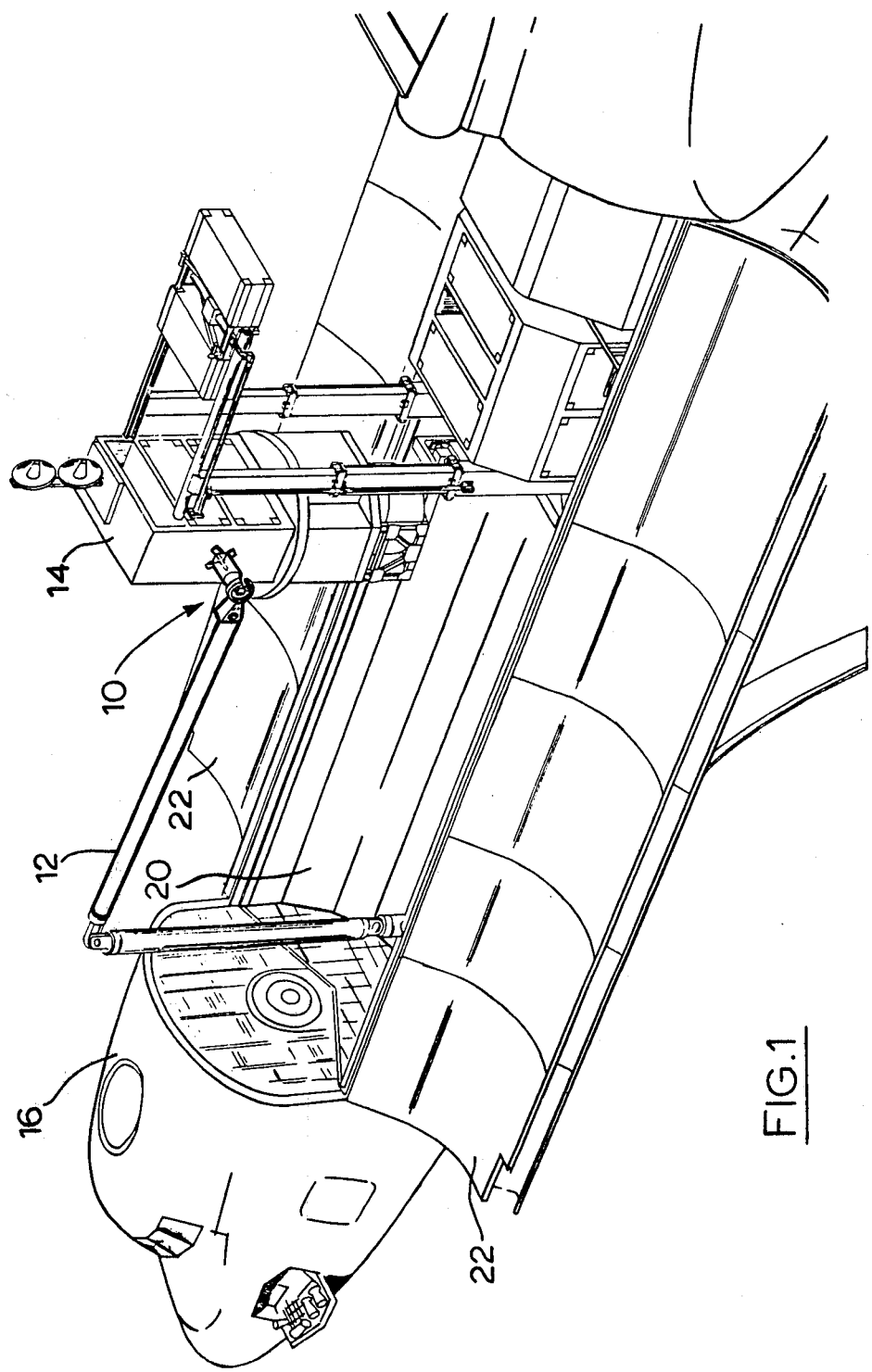

In FIG. 1 of the drawings, the reference numerals 10 refers generally to a wrist joint of the type of the present invention and serves to illustrate one application of this joint. The wrist joint 10 is mounted at the end of the satellite retrieval arm 12 used to engage a satellite 14 and to position the satellite in the service bay of a shuttle craft 16.

Figure 2:
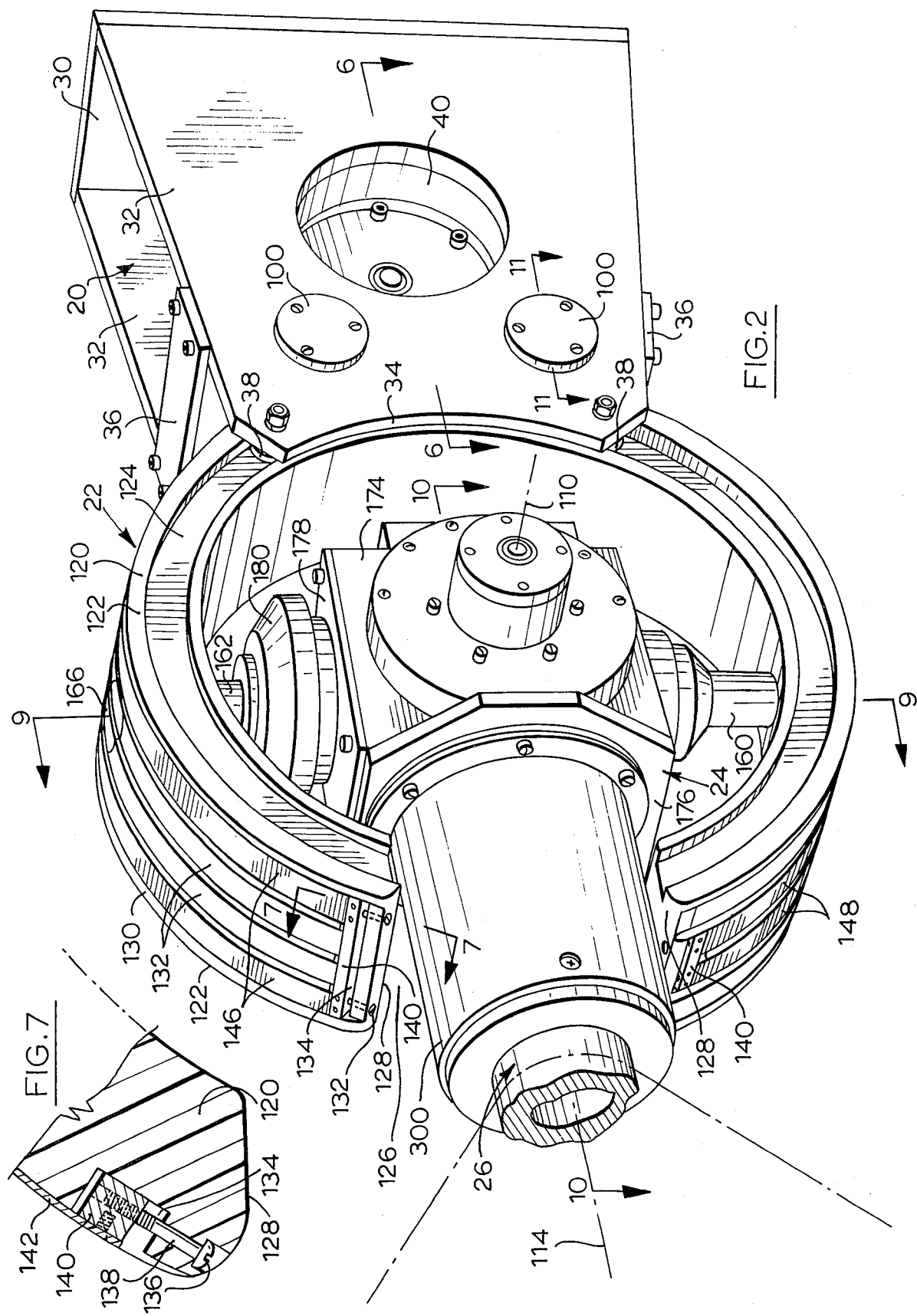
FIG. 2 is a pictorial view of a wrist joint according to an embodiment of the present invention.

As shown in FIG. 2 of the drawings, the powered wrist joint consists of a base member generally identified by the reference numeral 20, a pitch member generally identified by the reference numeral 22, a housing generally identified by the reference numeral 24 and a roll shaft generally identified by the reference numeral 26.

BASE MEMBER

In the embodiment of the invention illustrated in FIG. 2 of the drawings, the base member 20 is shown as an independent component which may be readily mounted onto any supporting structure as, for example, the manipulating arm 12 (FIG. 1). It will, however, be understood that this matter and its associated components may be built into and form an integral part of the support structure.

Figure 6:
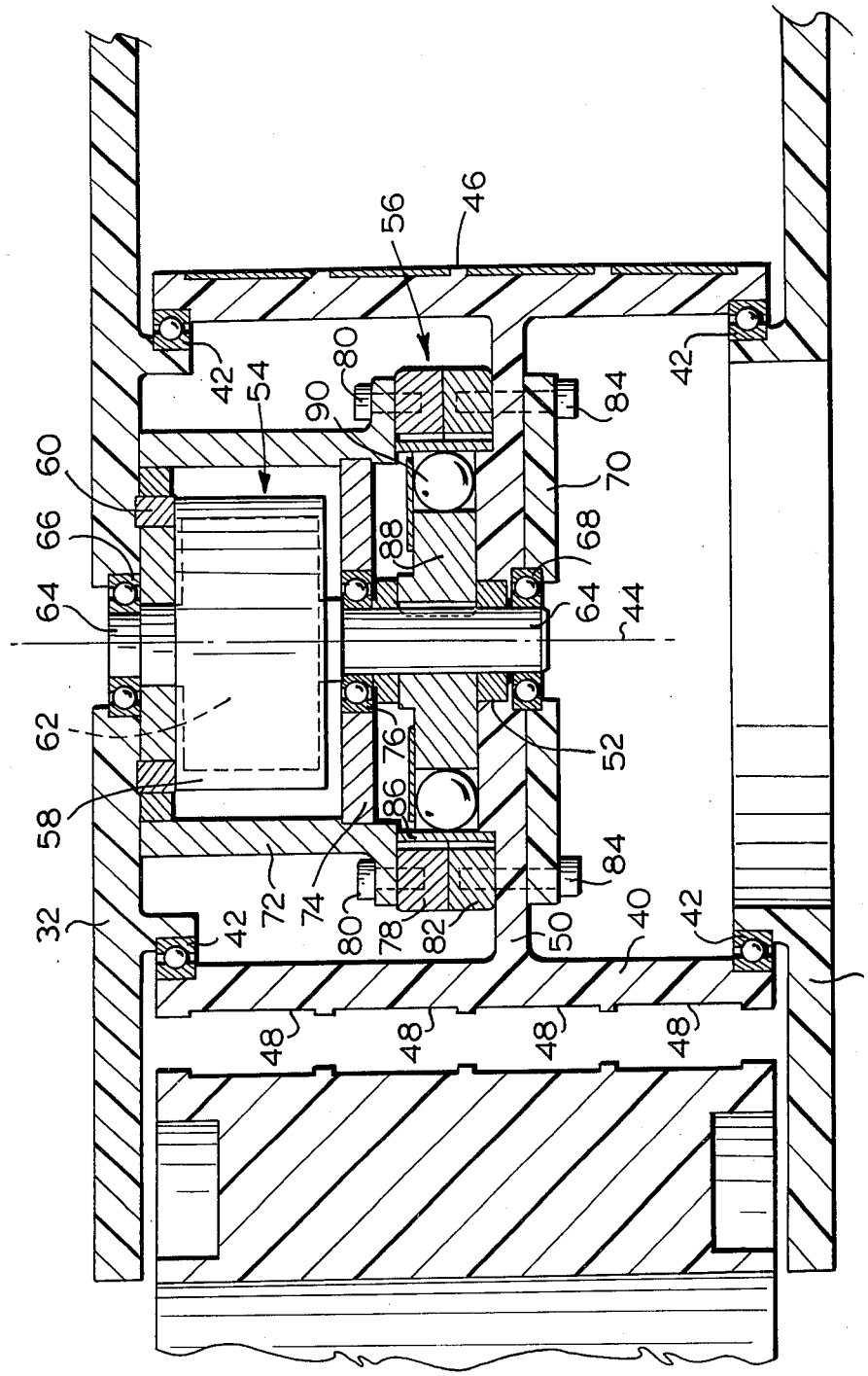
FIG. 6 is a sectional view of the pitch drive taken along the line 6—6 of FIG. 2.
Figure 11:
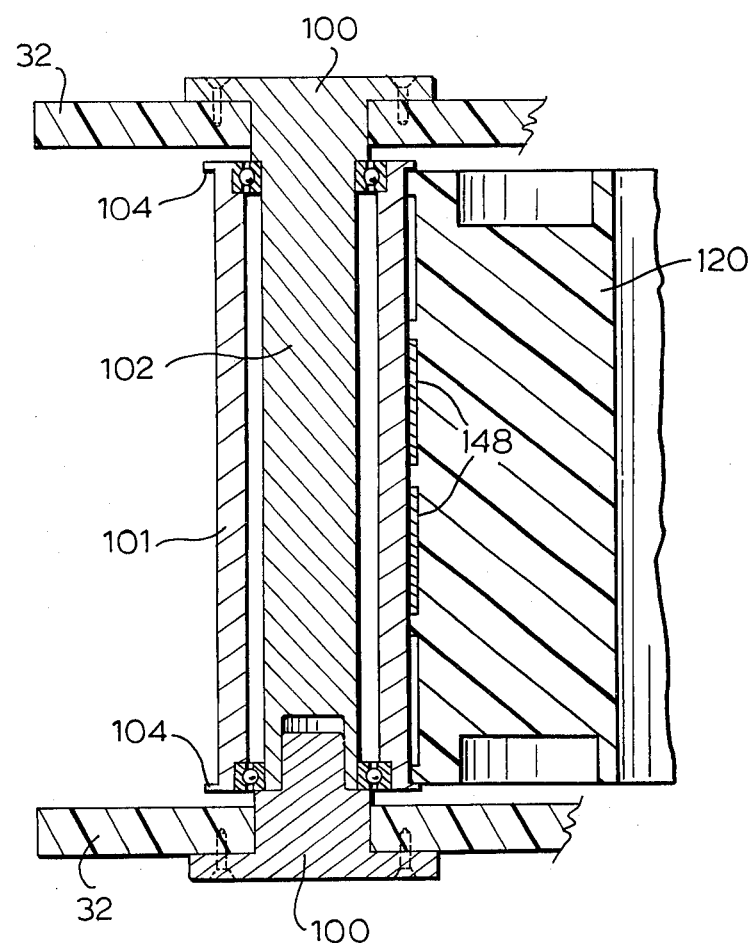
FIG. 11 is a sectional view taken along the line 11—11 of FIG. 2.

The structure of the base member of the preferred embodiment is illustrated in FIGS. 2, 6 and 11 of the drawings. As shown in FIG. 2, the base member consists of a base plate 30 and a pair of oppositely disposed side plates 32 which are secured to the base plate and extend outwardly therefrom in a spaced parallel relationship with respect to one another. The outer edge 34 of each of the plates 32 has an arcuate curvature conforming to the curvature of the pitch member. A pair of brace plates are connected to and extend transversely between the side plates 32 adjacent the pitch member and serve to secure the plate 32 with respect to one another in their spaced relationship. A pair of guide rollers 38 are mounted on each side plate 32 adjacent the outer ends thereof circumferentially spaced intervals about the pitch axis.

As shown in FIGS. 2 and 6 of the drawings, a winding drum 40 is supported by bearings 42 which are carried by the side plates 32, for rotation about the axis 44 which extends parallel to the pitch axis. The winding drum 40 has a cylindrical outer surface 46 in which four shallow circumferentially extending channels 48 are formed to receive the drive bands as will be described hereinafter. A flange 50 projects radially inwardly of the drum 40 and has a central passage 52 located centrally thereof on the axis 44.

The pitch drive means consists of a pitch drive motor generated by the reference numeral 54 and a harmonic reduction gear generally identified by the reference number 56. The motor 54 has a stator portion 58 which is rigidly secured with respect to one of the side plates 32 by means of a plurality of mounting bolts (not shown) which extend from the plate 32 through a spacer collar 60 to the stator 58. The rotor 62 has a shaft 64 which extends outwardly from opposite ends thereof. One end of the shaft 64 is mounted in a bearing 66 which is carried by one of the side plates 32. The other end of the shaft 64 is mounted in a bearing 68 which is secured to the flange 50 of the winding drum by means of a face plate 70. A reduction gear support casing 72 is secured with respect to the face plate 32 by a plurality of mounting bolts (not shown). An additional bearing 76 is located in a position supporting the shaft 64 by means of an end plate 74 which is carried by the casing 72. The harmonic reduction gear drive has one gear ring 78 secured to the casing 72 by means of mounting screws 80 and a second gear member 82 secured with respect to the flange 50 of the drum by means of a plurality of screws 84. The flexible drive ring 86 is located inwardly of the gears 78 and 82 and is meshed therewith in a conventional manner. The eccentric rotor 88 of the harmonic reduction gear drive is keyed to the shaft 64 and a free floating ball bearing assembly 90 is disposed between the rotor 88 and the flexible drive ring 86. Harmonic drive reduction gears of this type are well known and have the advantage of a very high reduction ratio which is particularly suitable in installations such as that of the present application. When power is supplied to the motor, the rotor 62 is rotatably driven and in turn the winding drum 40 is driven through the harmonic reduction drive.

FIG. 11 of the drawings illustrates the structure of the band guide rollers and the end plates 100, two of which are illustrated in FIG. 2. Each roller assembly comprises a cylindrical roller 101 mounted for rotation on a shaft 102. The roller 101 has radially extending end flanges 104 at opposite ends thereof. The shaft 102 is in two halves which are interlocked with one another and have end plates 100 secured with respect to the side plates 32.

AXES OF ROTATION

Figure 3:
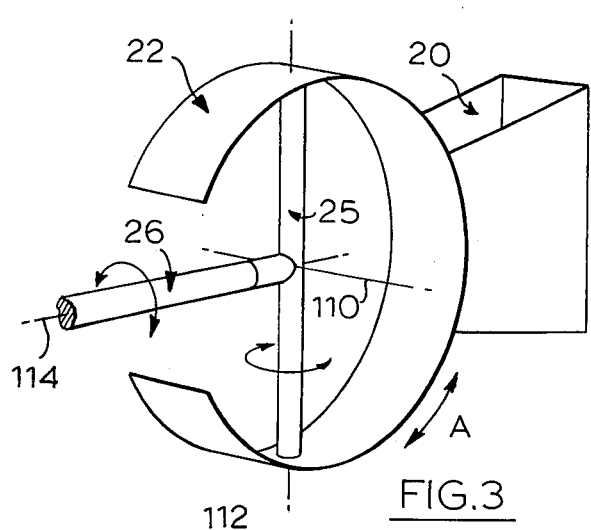
FIG. 3 is a diagrammatic illustration of the wrist joint of FIG. 2 illustrating the various axes about which the joint may be driven.
Figure 4:
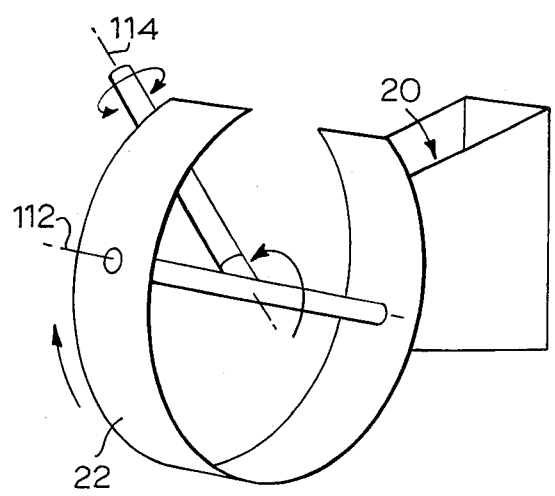
FIG. 4 is a view similar to FIG. 3 showing the wrist joint in a second position.

FIG. 3 of the drawings diagrammatically illustrates the wrist joint which is detailed in FIG. 2 in which, as previously indicated, the reference numeral 20 refers generally to the base member and the reference numeral 22 refers to the pitch member and the reference numeral 26 refers generally to the roll shaft. For the purposes of this diagrammatic illustration, the reference numeral 25 refers generally to the yaw shaft. The pitch drive mechanism described above serves to drive the pitch member 22 about the pitch axis 110 in a direction illustrated by the doubleheaded arrow A. The yaw drive mechanism, which is yet to be described, serves to rotatably drive the assembly carried by the yaw shaft 25 about the yaw axis 12. Similarly, the roll drive mechanism, which is yet to be described, serves to rotatably drive the roll shaft 26 about the roll axis 114. It will be noted that the pitch axis 110, yaw axis 112 and roll axis 114 intersect one another at a common center located inwardly of the pitch member. FIG. 4 shows one of many positions which the wrist joint may assume when operational.

PITCH MEMBER

Figure 9:
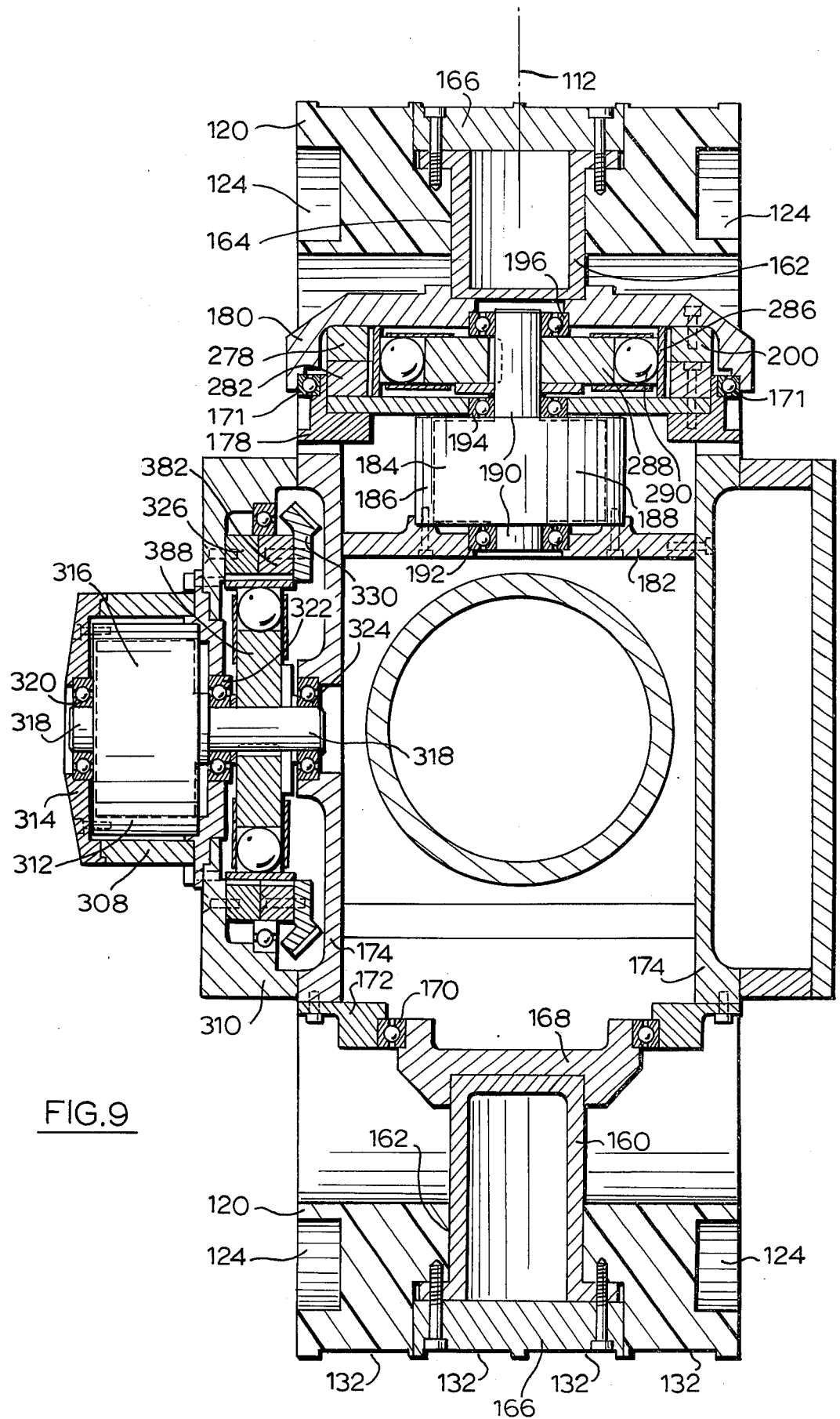
FIG. 9 is a sectional view taken along the line 9—9 of FIG. 2.

The pitch member is illustrated in detail in FIGS. 2, 7 and 9, to which reference is now made. As shown in FIG. 2, the pitch member consists of a C-shaped ring 120 which has a pair of oppositely disposed side faces 122, in each of which a U-shaped guide channel 124 is formed. The channel 124 extends about the entire periphery of side faces 122 and is arranged concentrically with the pitch axis 110. The C-shaped pitch ring is supported on the base member 20 by the guide rollers 38 which are located in a close fitting rolling relationship with the channels 124. The C-shaped pitch ring has a yaw passage 126 opening outwardly therefrom between the end faces 128. The end faces 128 are equally spaced from the plane of the roll axis 114.

The pitch member 120 has an outer winding surface 130 formed with four circumferentially extending channels 132, each of which is adapted to receive a drive band in a close fitting relationship as will be described hereinafter. As shown in FIG. 7 of the drawings, a recess 134 is located adjacent each end face 128 of the C-shaped ring and a pair of adjustment screws 136 extend through passages 138 into the recesses 134. An adjustment block 140 is located in the recess 134 and extends longitudinally thereof. The block 140 has a width which is substantially less than the width of the recess 134 and is threadably mounted on the adjustment screws 136. Rotation of the adjustment screws 136 drives the block 140 towards and away from the end face 128. The flexible drive bands 142 each have an end portion secured to an adjustment block 140 such that the adjustment screw 136 may be adjusted to vary the tension applied to the drive bands 142.

DRIVE BANDS

Figure 5:
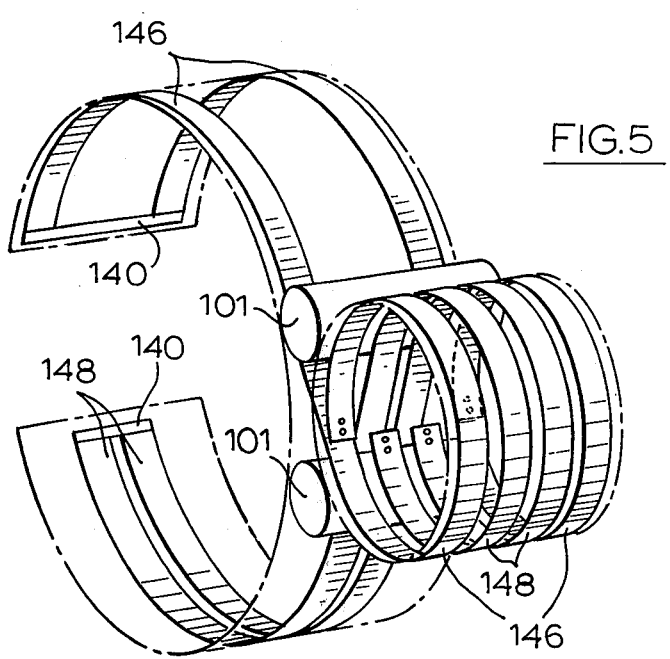
FIG. 5 is a pictorial view of the pitch drive bands.

The driving connection between the winding drum 40 of the pitch drive mechanism and the pitch ring 120 consists of four flexible metal drive bands 146, 148 (FIG. 5). As previously described with reference to FIG. 7, the ends of the bands 146 are secured to an adjustment bar 140. As shown in FIG. 5, the ends of the bands 148 are secured to a further adjustment bar 140. The flexible bands 146, 148 extend within the channels 132 formed in the C-ring 120 and the channels 48 formed in the winding drum 40. The bands 146 extend in a clockwise direction about the pitch ring 120 and a counterclockwise direction about the winding drum 40 as viewed in FIG. 5. The bands 148 extend in a counterclockwise direction about the pitch ring 120 and in a clockwise direction about the winding drum 40. The guide rollers 101 which are diagrammatically illustrated in FIG. 5 of the drawings are located closely adjacent the pitch ring 120 and serve to retain the arc of contact between the bands 146, 148 and the pitch ring 120.

Figure 8:
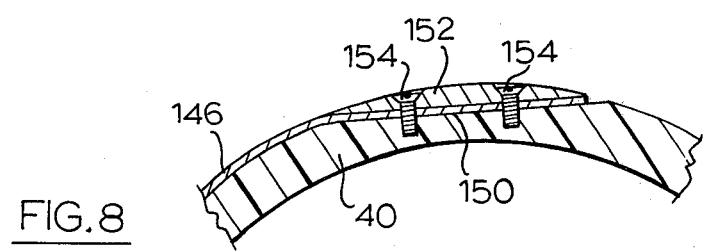
FIG. 8 is a section through the wall of the winding drum illustrating the manner in which the ends of the drive bands are secured to the drum.

As shown in FIG. 8 of the drawings, the winding drum 40 is formed with a flat face 150 which is spaced inwardly from the outer circumference thereof. The ends of the bands 146, 148 are clamped between the face 150 and an arcuate segment 152 by means of a plurality of screws 154. The segment 152 has an outer curved surface extending in the plane of the cylindrical surface of the winding drum so that the winding drum can wind a full 360° length of band thereabout.

YAW DRIVE AND HOUSING

The housing 24 and its associated yaw drive and yaw axis support is illustrated in FIGS. 2 and 9 of the drawings.

Figure 10:
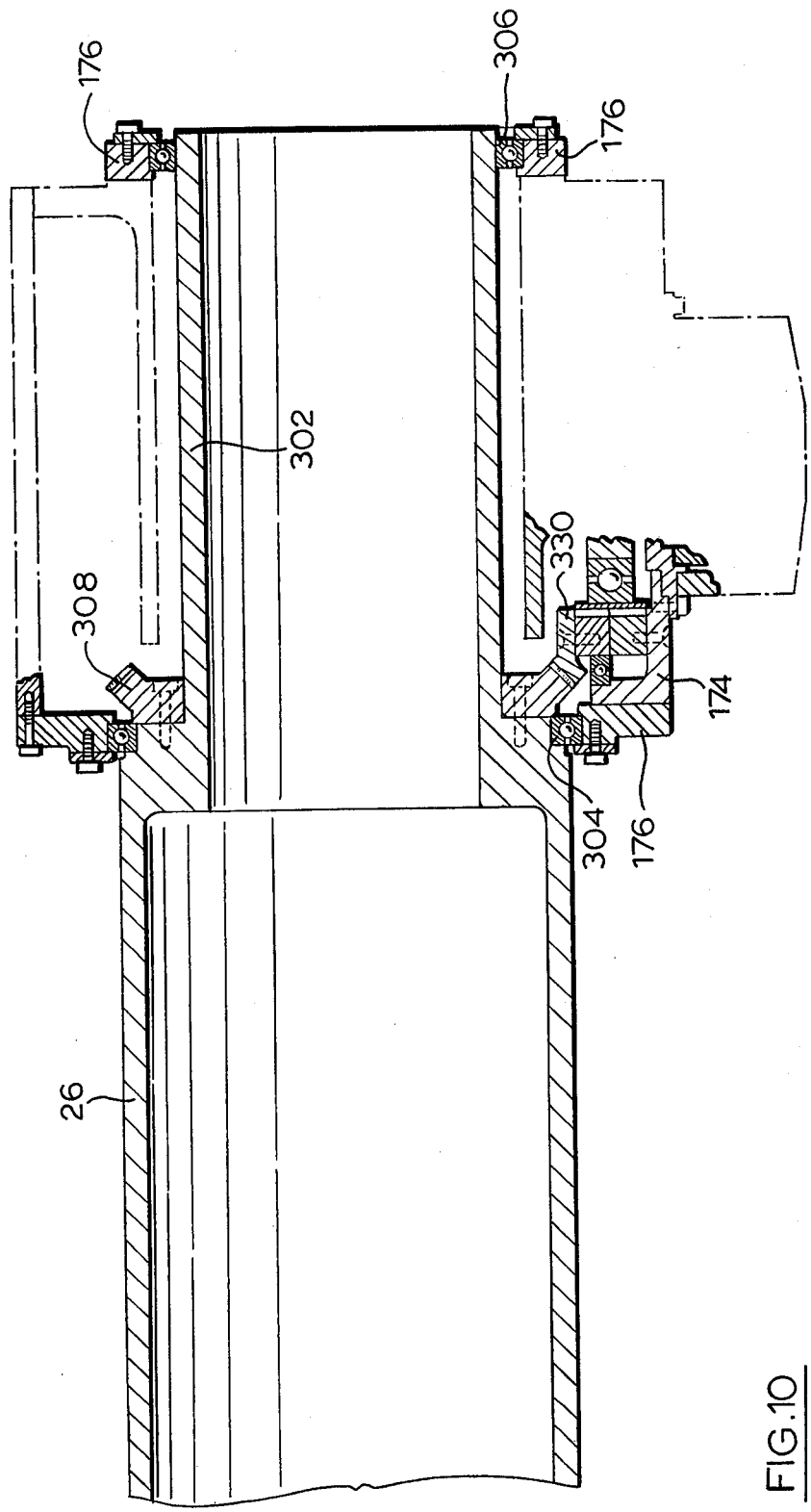
FIG. 10 is a sectional view taken along the line 10—10 of FIG. 2.

A pair of stub axles 160 and 162 project inwardly from the pitch ring 120 along the yaw axis 112. As shown in FIG. 9 of the drawings, the axles 160 and 162 extend through passages 164 formed in the ring 120 and are secured therein by means of plugs 166. A bearing support plate 168 is mounted at the inner end of the stub shaft 160 and supports a bearing 170 which is mounted in the end plate 172 of the housing. A pair of side plates 154 are secured to the base plate 172 as are a second pair of side plates 176 (FIGS. 2 and 10). A hot plate 178 is secured at the upper end of the side walls 174 and 176 for rotation therewith about the yaw axis 112. An end plate 180 is secured to the stub shaft 162. A yaw motor mounting plate 182 is located within the housing and is secured with respect to the side plates 174 in a position supporting the yaw motor 184 in axial alignment with the yaw axis 112. The yaw motor 184 has a stator portion 186 secured to the support plate 182 and a rotor 188 is mounted for rotation therein. The shaft 190 of the rotor has one end mounted in bearing 192 carried by the plate 182 and its other end mounted in bearings 194 and 196. The harmonic reduction gear generally identified by the reference numeral 200 drivingly connects the shaft 190 to the stub shaft 162 by way of the base plate 180. The structure of the harmonic reduction gear mechanism 200 is the same as that previously described with respect to the pitch drive mechanism and the reference numerals applied in FIG. 9 are the same as those appearing in FIG. 6 with the prefix 2 applied to distinguish the yaw member from the pitch member.

When the yaw motor is activated, rotation of the rotor causes rotation of the housing on bearings 170 and 171 about the yaw axis 112.

ROLL SHAFT

As shown in FIG. 2 of the drawings, a roll shaft casing 300 is mounted on an end plate 176 of the housing 24 and projects outwardly therefrom in the plane of the roll axis 114. The roll shaft 26 has an inner portion 302 of reduced diameter which is mounted for rotation in the end plates 176 by means of bearings 304 and 306. A bevelled gear 308 is secured to the shaft at one end of the reduced portion 302 and projects inwardly of the housing 24.

As shown in FIG. 9 of the drawings, a roll motor 308 is mounted on a circular support collar 310 which is secured to the end plate 174. Stator 312 of the motor is secured with respect to the motor housing 314 and the rotor 316 has a shaft 318 projecting from the opposite ends thereof. Bearings 320, 322 and 324 rotatably support the shaft 318. A harmonic reduction gear 326 of the same construction as that previously described with reference to the pitch motor has its eccentric ring 388 secured to shaft 318. A bevelled gear wheel 330 is secured to the moving ring 382 of the harmonic reduction drive. The reference numerals applied to the harmonic reduction drive of the roll mechanism are the same as those applied to the pitched roll mechanism increased by the factor of 300.

As shown in FIG. 10 of the drawings, the bevelled gear 330 of the roll drive mechanism is meshed with the bevelled gear 308 of the roll shaft so that when the roll motor is activated, it will rotatably drive the roll shaft 26 through the harmonic drive reduction mechanism and the bevelled gears 330 and 308.

From the foregoing, it will be apparent that the wrist joint of the preferred embodiment is capable of closely controlled manipulation about the pitch, yaw and roll axes.

The provision of independent drive motors and the use of harmonic reduction gears in association with each drive motor provides a compact and reliable drive system with a minimum of moving parts. This desirable characteristic is further enhanced by the fact that the yaw and roll motors are mounted directly in the housing and, in fact, the rotors of each of these motors are formed as an integral part of the housing.

In addition, the use of bands and the provision of tension adjustment for the bands provides a very simple drive mechanism for the pitch ring.

These and other advantages of the present invention will be apparent to those skilled in the art.

What we claim as our invention is:

1. A powered wrist joint comprising,
    (a) a base member,
    (b) a pitch member having a drive chamber formed therein and a yaw passage opening outwardly from said drive chamber, said pitch member being mounted on said base member for rotation about a pitch axis which extends through said drive chamber,
    (c) pitch drive means on said base and drivingly connected to said pitch member for rotatably driving said pitch member about said pitch axis,
    (d) yaw shaft means mounted on said pitch member and extending across said drive chamber along a yaw axis which is disposed at right angles to and intersects said pitch axis,
    (e) a housing mounted on said yaw shaft means for rotation about said yaw axis,
    (f) yaw drive means mounted in said housing and drivingly connected to said yaw shaft for rotatably driving said housing about said yaw axis, and
    (g) a roll shaft mounted for rotation in said housing about a roll axis which is disposed at right angles to said pitch and yaw axes and intersects said pitch and yaw axes at their point of intersection and thereby provides a common center of pitch, yaw and roll gyration, said roll shaft projecting outwardly from said drive chamber in a yaw plane which extends through said yaw passage, roll drive means mounted in said housing and drivingly connected to said roll shaft for rotatably driving said roll shaft about said roll axis.

2. A powered wrist joint as claimed in claim 1 wherein said pitch member has an outer winding surface arranged in an arc generated from said pitch axis whereby rotation of the pitch member about said pitch axis causes said winding surface to rotate about said pitch axis.

3. A powered wrist joint as claimed in claim 2 wherein said pitch drive means includes, a winding drum mounted in said base member for rotation about an axis parallel to said pitch axis, said winding drum having an outer cylindrical surface arranged side by side said outer winding surface of said pitch member, and flexible drive bands connected to and extending around said winding surface of said pitch member and said cylindrical surface of said winding drum, said pitch drive means being drivingly connected to said drum to rotatably drive said drum about its axis to wind said flexible drive bands onto and off of said cylindrical surface of said drum and said winding surface of said pitch member to rotatably drive said pitch member about said pitch axis.

4. A powered wrist joint as claimed in claim 3 wherein said flexible drive bands include at least one wrist band extending in a clockwise direction about said winding surface of said pitch member and in a counterclockwise direction about said cylindrical outer surface of said winding drum, and at least one second band extending in a counterclockwise direction about said winding surface and in a clockwise direction about said winding drum whereby said first and second bands provide a positive drive connection between said winding drum and said pitch member for rotation of the pitch member in the clockwise and counterclockwise direction.

5. A powered wrist joint as claimed in claim 4 wherein two first bands and two second bands are provided, said first bands being arranged side by side one another and said second bands being arranged one on either side of said pair of first bands.

6. A powered wrist joint as claimed in claim 5 wherein said winding surface of said pitch member is formed to provide four circumferentially extending channels, one of said bands being located in each channel and restrained thereby against lack of movement with respect to said pitch member.

7. A powered wrist joint as claimed in claim 4 including band adjustment means at at least one end therefor for pretensioning said bands to eliminate backlash from the drive means.

8. A powered wrist joint as claimed in claim 4 wherein the ratio of winding surface diameter to drum diameter is 2:1.

9. A powered wrist joint as claimed in claim 4 wherein said pitch member is rotatable about said pitch axis through an arc of 270°.

10. A powered wrist joint as claimed in claim 1 wherein said pitch member is in the form of a C-shaped ring having a pair of oppositely disposed side faces and a guide track formed in each side face and extending in an arc generated from said pitch axis, guide means on said base member engaging said guide track to mount said pitch member for rotation about said pitch axis.

11. A powered wrist joint as claimed in claim 10 wherein each of said guide tracks consists of a channel-shaped recess and said guide means comprises roller means mounted on said base and extending into said channel at circumferentially shaped intervals thereabout.

12. A powered wrist joint as claimed in claim 4 including intermediate guide rollers mounted on said housing for rotation about axes parallel to said pitch axis, said rollers being disposed between said winding surface and said drum and closely adjacent said winding surface to engage said bands and maintain a substantial arc of contact between said bands and said winding surface for all positions of said pitch member.

13. A powered wrist joint as claimed in claim 1 wherein said yaw shaft means comprises a pair of stub shafts projecting inwardly from opposite sides of said pitch member, said yaw drive means comprising an electric motor having a stator portion secured with respect to said housing for rotation with said housing and a rotor portion having an output drive shaft projecting towards one of said stub shafts on said yaw axis, harmonic reduction gear means connecting said rotor shaft to said one stub shaft whereby when said motor is actuated said housing is rotatably driven about said yaw axis through said reduction gear.

* * * * *